United States Patent
Konno (10) Patent No.: US 10,678,531 B2
(45) Date of Patent: Jun. 9, 2020

(54) SOFTWARE UPDATING SYSTEM OF PHYSIOLOGICAL INFORMATION DETECTING SENSOR

(71) Applicant: Nihon Kohden Corporation, Shinjuku-ku, Tokyo (JP)

(72) Inventor: Norihito Konno, Tokyo (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 24 days.

(21) Appl. No.: 16/026,960

(22) Filed: Jul. 3, 2018

(65) Prior Publication Data
US 2019/0012163 A1 Jan. 10, 2019

(30) Foreign Application Priority Data
Jul. 5, 2017 (JP) .................................. 2017-131788

(51) Int. Cl.
*A61B 5/00* (2006.01)
*A61B 5/0205* (2006.01)
(Continued)

(52) U.S. Cl.
CPC ...................................... *G06F 8/65* (2013.01)

(58) Field of Classification Search
CPC ......... G06F 19/00; G06F 8/65; A61B 5/0022; A61B 5/02055; A61B 5/14551;
(Continued)

(56) References Cited

U.S. PATENT DOCUMENTS 9,600,991 B2 * 3/2017 Chen ................. A61B 5/150358
9,766,959 B2 * 9/2017 Faaborg ............... A61B 5/0484
(Continued)

FOREIGN PATENT DOCUMENTS

JP 2014-068718 A 4/2014

OTHER PUBLICATIONS

Taylor et al., Using physiological sensors to detect levels of user frustration induced by system delays, 12 pages (Year: 2015).*
Lioulemes et al., A Survey of Sensing Modalities for Human Activity, Behavior, and Physiological Monitoring, 8 pages (Year: 2016).*

*Primary Examiner* — Thuy Dao
(74) *Attorney, Agent, or Firm* — Pearne & Gordon LLP (57) ABSTRACT

A method includes: receiving, from at least one physiological information detecting sensor, flag information indicating whether an acceleration of the physiological information detecting sensor is higher than a threshold or not, and sensor identification information of the physiological information detecting sensor, wherein the flag information and the sensor identification information are associated with each other, and the physiological information detecting sensor stores first software; displaying the sensor identification information on a display; changing a visual aspect of the sensor identification information displayed on the display in accordance with the flag information; transmitting second software for updating a version of the first software to the physiological information detecting sensor indicated by the sensor identification information selected through a user input operation; and updating the version of the first software based on the second software.

5 Claims, 9 Drawing Sheets

(51) Int. Cl.
*A61B 5/11* (2006.01)
*A61B 5/024* (2006.01)
*A61B 5/01* (2006.01)
*G06F 8/65* (2018.01)

(58) Field of Classification Search
CPC ... A61B 5/02416; A61B 5/0402; A61B 5/746; A61B 5/0205; A61B 5/02438; A61B 5/002; A61B 5/01; A61B 5/7203; A61B 5/7246; G16H 40/65; G16H 40/67; G16H 40/63

See application file for complete search history.

(56) References Cited

U.S. PATENT DOCUMENTS

| | | | |
|---|---|---|---|
| 10,028,660 B2 * | 7/2018 | Mullin | A61B 5/742 |
| 10,130,261 B2 * | 11/2018 | Tzvieli | G06K 9/00234 |
| 10,172,557 B2 * | 1/2019 | Altebaeumer | A61B 5/02416 |
| 10,314,546 B2 * | 6/2019 | Lisogurski | A61B 5/0205 |
| 10,327,652 B2 * | 6/2019 | Hu | A61B 5/0015 |
| 2012/0249332 A1 * | 10/2012 | Tezuka | A61B 5/746 340/573.1 |
| 2015/0371198 A1 * | 12/2015 | Jensen | G06Q 10/20 705/305 |
| 2018/0174679 A1 * | 6/2018 | Sampath | G16H 40/40 |
| 2019/0110755 A1 * | 4/2019 | Capodilupo | A61B 5/7267 |

* cited by examiner

SOFTWARE UPDATING SYSTEM OF PHYSIOLOGICAL INFORMATION DETECTING SENSOR

CROSS-REFERENCE TO RELATED APPLICATION

This application claims priority from Japanese Patent Application No. 2017-131788 filed on Jul. 5, 2017, the entire contents of which are incorporated herein by reference.

BACKGROUND

1. Technical Field

The present disclosure mainly relates to a system for updating a version of software stored in a physiological information detecting sensor.

2. Background Art

According to the background art, physiological information detecting sensors (medical telemeters) each provided with a wireless communication section have been known in a medical instrument field (e.g. see JP-A-2014-68718).

In such a physiological information detecting sensor, it is considered that a version of first software (e.g. firmware) installed in the physiological information detecting sensor is updated based on second software received from an external apparatus through the wireless communication section (upgrade of the physiological information detecting sensor)

However, a display portion such as an LED may be not provided in the physiological information detecting sensor from the viewpoint of reduction in size, power consumption etc. In this case, when a plurality of physiological information detecting sensors are, for example, intended to be upgraded sequentially, there is a problem that it is difficult to visually identify the physiological information detecting sensors as targets to be upgraded (as a result, some of the target physiological information detecting sensors scheduled to be upgraded cannot be upgraded, but, for example, unintended physiological information detecting sensors are upgraded).

SUMMARY

One of aspects of the present embodiment provide a mechanism in which it is possible to visually recognize a physiological information detecting sensor that is not provided with a display and is to be upgraded through wireless communication, According to a first aspect of the present embodiment, there is provided a system including at least one physiological information detecting sensor and an information processing apparatus wirelessly connected to the physiological information detecting sensor.

The physiological information detecting sensor includes:
an acceleration sensor that detects an acceleration of the physiological information detecting sensor;
a memory that stores first software, flag information indicating whether the acceleration is higher than a threshold or not, and sensor identification information of the physiological information detecting sensor, wherein the flag information and the sensor identification information are associated with each other;
a first transmitter that transmits, to the information processing apparatus, the flag information and the sensor identification information;
a first receiver that receives second software for updating a version of the first software; and
an updating section that updates the version of the first software based on the second software.

The information processing apparatus includes:
a second receiver that receives the flag information and the sensor identification information from the physiological information detecting sensor;
a display;
a display controller that displays the sensor identification information on the display; and
a second transmitter that transmits the second software to the physiological information detecting sensor indicated by the sensor identification information selected through a user input operation.

The display controller is configured to change a visual aspect of the sensor identification information displayed on the display in accordance with the flag information.

According to a second aspect of the present embodiment, there is provided a system including at least one physiological information detecting sensor and an information processing apparatus wirelessly connected to the physiological information detecting sensor.

The physiological information detecting sensor includes:
an acceleration sensor that detects an acceleration of the physiological information detecting sensor;
a memory that stores first software, acceleration information indicating the acceleration, and sensor identification information of the physiological information detecting sensor, wherein the acceleration information and the sensor identification information are associated with each other;
a first transmitter that transmits, to the information processing apparatus, the acceleration information and the sensor identification information;
a first receiver that receives second software for updating a version of the first software; and
an updating section that updates the version of the first software based on the second software.

The information processing apparatus includes:
a second receiver that receives the acceleration information and the sensor identification information from the physiological information detecting sensor;
a display;
a display controller that displays the sensor identification information on the display; and
a second transmitter that transmits the second software to the physiological information detecting sensor indicated by the sensor identification information selected through a user input operation.

The display controller is configured to change a visual aspect of the sensor identification information displayed on the display in accordance with whether the acceleration is higher than a threshold.

According to a third aspect of the present embodiment, there is provided an information processing apparatus.

The information processing apparatus is configured to:
i) receive, from at least one physiological information detecting sensor, flag information indicating whether an acceleration of the physiological information detecting sensor is higher than a threshold or not, and sensor identification information of the physiological information detecting sensor, wherein the flag information and the sensor identification information are associated with each other, and the physiological information detecting sensor stores first software;

ii) display the sensor identification information on a display;

iii) change a visual aspect of the sensor identification information displayed on the display in accordance with the flag information; and iv) transmit second software for updating a version of the first software to the physiological information detecting sensor indicated by the sensor identification information selected through a user input operation.

According to a fourth aspect of the present embodiment, there is provided a physiological information detecting sensor.

The physiological information detecting sensor includes:

an acceleration sensor that detects an acceleration of the physiological information detecting sensor;

a memory that stores first software, flag information indicating whether the acceleration is higher than a threshold or not, and sensor identification information of the physiological information detecting sensor, wherein the flag information and the sensor identification information are associated with each other;

a transmitter that transmits, to an information processing apparatus, the flag information and the sensor identification information;

a receiver that receives, from the information processing apparatus, second software for updating a version of the first software; and an updating section that updates the version of the first software based on the second software.

According to a fifth aspect of the present embodiment, there is provided a method including:

receiving, from at least one physiological information detecting sensor, flag information indicating whether an acceleration of the physiological information detecting sensor is higher than a threshold or not, and sensor identification information of the physiological information detecting sensor, wherein the flag information and the sensor identification information are associated with each other, and the physiological information detecting sensor stores first software;

displaying the sensor identification information on a display;

changing a visual aspect of the sensor identification information displayed on the display in accordance with the flag information;

transmitting second software for updating a version of the first software to the physiological information detecting sensor indicated by the sensor identification information selected through a user input operation; and updating the version of the first software based on the second software.

DETAILED DESCRIPTION

A medical telemeter system 10 which is an embodiment of the invention will be described below with reference to the accompanying drawings. Corresponding constituent elements in the respective drawings will be referred to by same signs respectively, and duplicated description thereof will be omitted.

[Overview of Medical Telemeter System 10]

Figure 1:
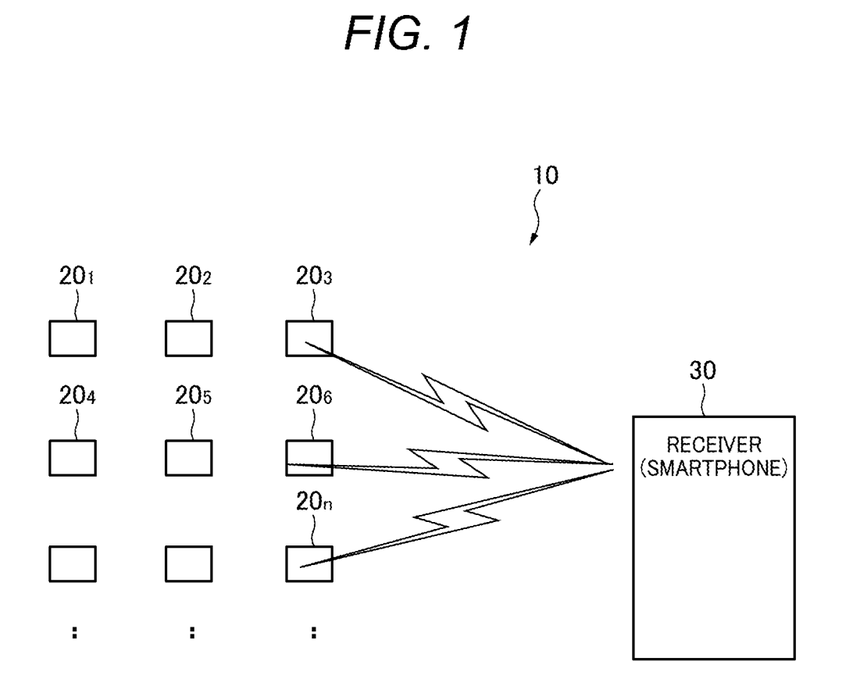
FIG. 1 is a schematic block diagram of a medical telemeter system 101.

FIG. 1 is a schematic block diagram of the medical telemeter system 10.

As illustrated in FIG. 1, a physiological information detecting sensor wireless system (hereinafter referred to as medical telemeter system 10) is provided with a plurality of physiological information detecting sensors $20_1$ to $20_n$, and an information processing apparatus (hereinafter referred to as receiver 30) etc. When the physiological information detecting sensors $20_1$ to $20_n$ are not distinguished from one another in particular, the physiological information detecting sensors $20_1$ to $20_n$ will be hereinafter described as physiological information detecting sensors 20 simply.

[Physiological Information Detecting Sensor]

Figure 2A:
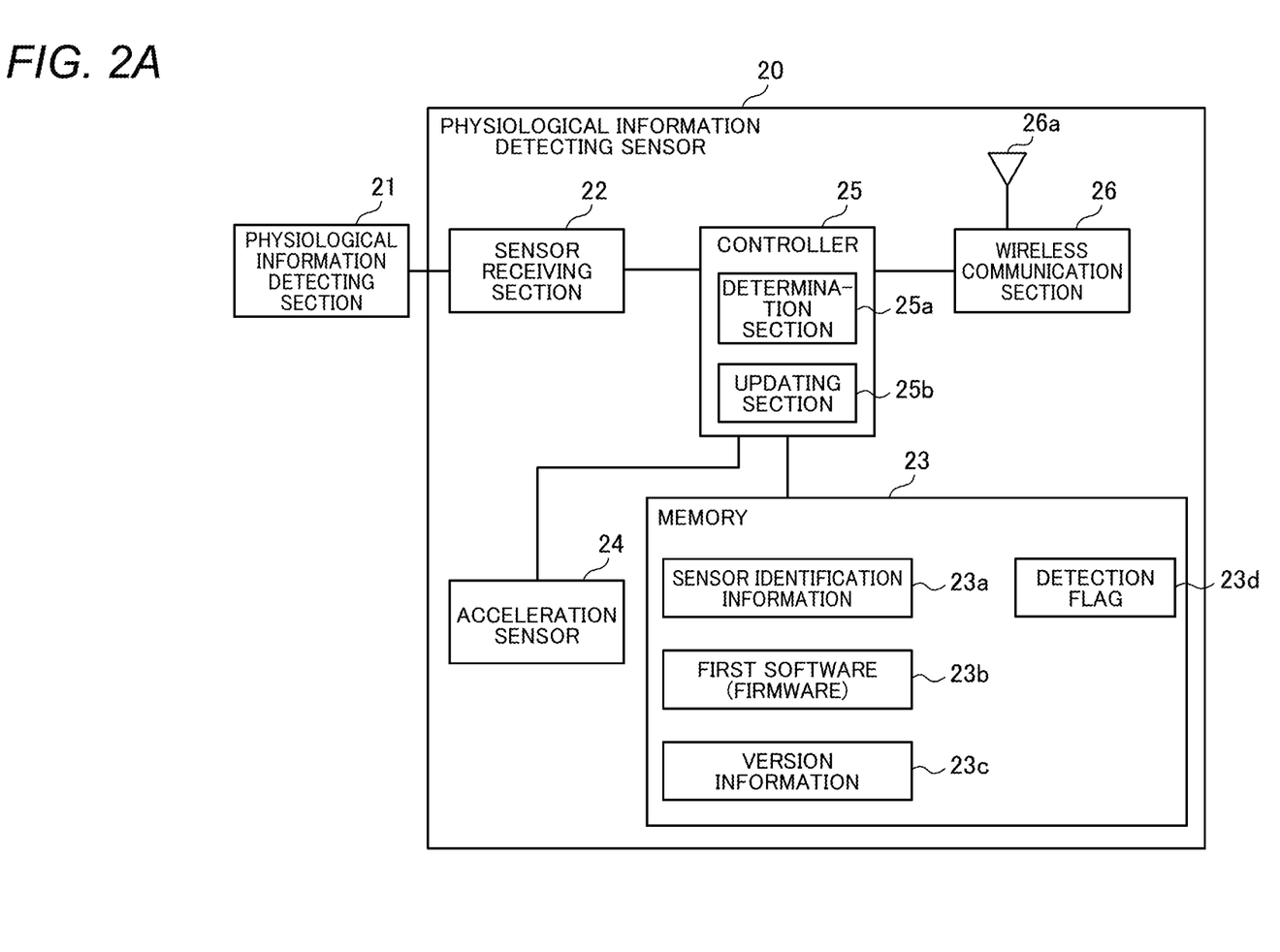
FIGS. 2A and 2B is a schematic hardware block diagram of a physiological information detecting sensor 20, and a schematic hardware block diagram of a receiver 30.

Next, the physiological information detecting sensor 20 will be described. FIG. 2A is a schematic hardware block diagram of the physiological information detecting sensor 20.

The physiological information detecting sensor 20 mounted on a pad (not illustrated) attached to a living body (hereinafter referred to as patient) measures physiological information (such as an ECG (electrocardiogram)) of the patient, and transmits the measured physiological information to the receiver 30 etc. through a wireless communication section 26.

As illustrated in FIG. 2A, the physiological information detecting sensor 20 is provided with a physiological information detecting section 21, a sensor receiving section 22, a memory 23, an acceleration sensor 24, a controller 25, and the wireless communication section 26.

The physiological information detecting section 21 detects the physiological information (or a vital sign signal) of the patient. The physiological information detecting section 21 is, for example, three lead electrodes (R, L, F) that detect the ECG of the patient.

The sensor receiving section 22 amplifies and analog-to-digital (A/D) converts the physiological information of the patient detected by the physiological information detecting section 21, and receives the amplified and A/D converted physiological information of the patient to the controller 25.

The memory 23 is, for example, a non-volatile memory that can read and write, such as a flash ROM. A sensor identification information 23a of the sensor, firmware (hereinafter referred to as first software 23b), a version information 23c of the first software 23b, etc. are stored in advance in the memory 23. In addition, flag information (hereinafter referred to as detection flag 23d) indicating whether an acceleration detected by the acceleration sensor 24 is higher than a threshold or not is stored in the memory 23. Information (e.g. 0) indicating that the acceleration detected by the acceleration sensor 24 is not higher than the threshold or information (e.g. 1) indicating that the acceleration detected by the acceleration sensor 24 is higher than the threshold is set (stored) in the detection flag 23d.

The acceleration sensor 24 is, for example, a triaxial acceleration sensor (MEMS sensor). The acceleration (acceleration data) detected by the acceleration sensor 24 is inputted to the controller 25.

The controller 25 includes a CPU and an RAM. The CPU of the physiological information detecting sensor 20 that executes the first software 23b stored in the memory 23 functions as a determination section 25a, an updating section 25b etc. The determination section 25a is configured to determine whether the acceleration detected by the acceleration sensor 24 is higher than the threshold or not. The updating section 25b is configured to update the version of the first software 23b based on second software 33b received by the wireless communication section 26. In addition, the CPU of the physiological information detecting sensor 20 that executes the first software 23b stored in the memory 23 is configured to control the wireless communication section 26 etc. For example, the CPU of the physiological information detecting sensor 20 is configured to transmit the physiological information detected (measured) by the physiological information detecting section 21 to the receiver 30 through the wireless communication section 26.

The wireless communication section 26 is, for example, a communication module (e.g. a BLE (Bluetooth Low Energy) module) conformable to BLE technology. The wireless communication section 26 is configured to communicate with another BLE-conformable device (e.g. the receiver 30) by wireless within a short range (e.g. 100 mm) through an antenna 26a. The wireless communication section 26 corresponds to a first transmitter and a first receiver. Incidentally, the physiological information detecting sensor 20 functions as a peripheral (also referred to as slave).

[Receiver]

Figure 2B:
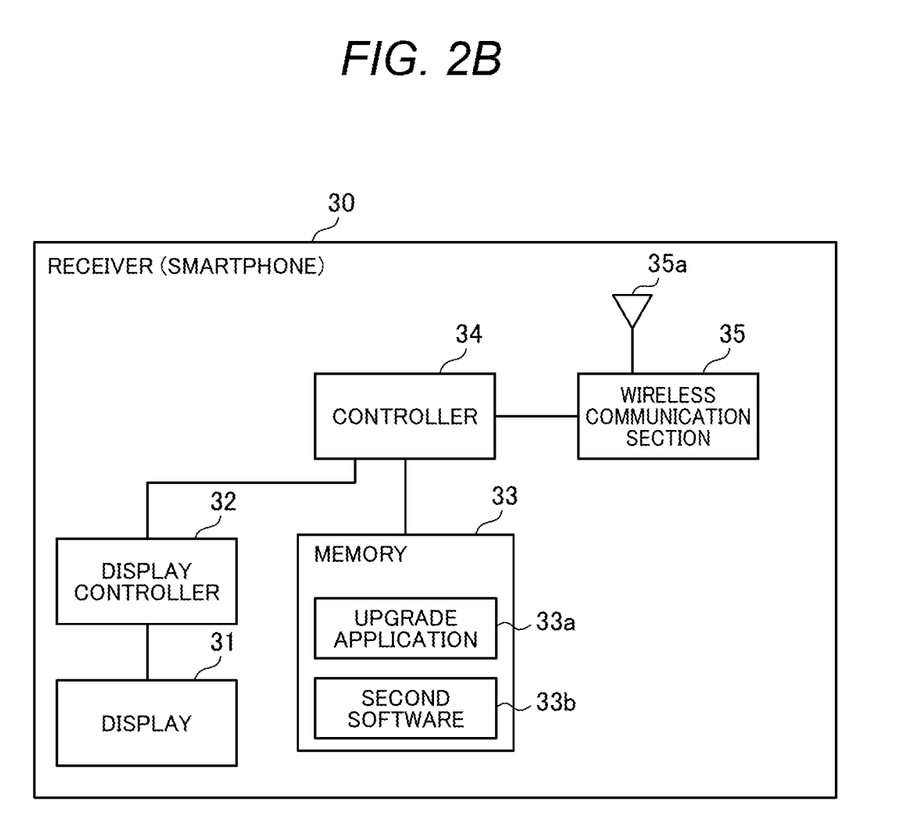

Next, the receiver 30 will be described. FIG. 2B is a schematic hardware block diagram of the receiver 30.

The receiver 30 is, for example, a smart phone. As illustrated in FIG. 2B, the receiver 30 is provided with a display 31, a display controller 32, a memory 33, a controller 34, and a wireless communication section 35.

The display 31 is, for example, a touch panel-including liquid crystal display.

The display controller 32 is configured to display, for example, the sensor identification information 23a and the version information 23c (see FIGS. 5A to 5C) on the display 31 in accordance with control made from the controller 34. An operator (e.g. a medical operator) taps the display 31 through the touch panel to select the physiological information detecting sensor 20 (the sensor identification information 23a) to be upgraded. The touch panel corresponds to a selection portion.

The memory 33 is, for example, a non-volatile memory that can read and write, such as a flash ROM. An upgrade application 33a, the second software 33b for updating the version of the first software 23b, etc. are stored in advance in the memory 33. The second software 33b is, for example, firmware in which bugs of the first software 23b have been fixed or the function of the first software 23b has been improved.

The controller 34 includes a CPU and an ROM. The CPU of the receiver 30 that executes the upgrade application 33a stored in the memory 33 controls the display controller 32, the wireless communication section 35, etc.

The wireless communication section 35 is, for example, a communication module (e.g. BLE (Bluetooth Low Energy) module) conformable to BLE technology. The wireless communication section 35 is configured to communicate with another BLE-conformable device (e.g. the physiological information detecting sensor 20) by wireless within a short range (e.g. 100 mm) through an antenna 35a. The wireless communication section 35 corresponds to a second receiver and a second transmitter. Incidentally, the receiver 30 functions as a central (also referred to as master).

Operation Example of Medical Telemeter System 10

Figure 3:
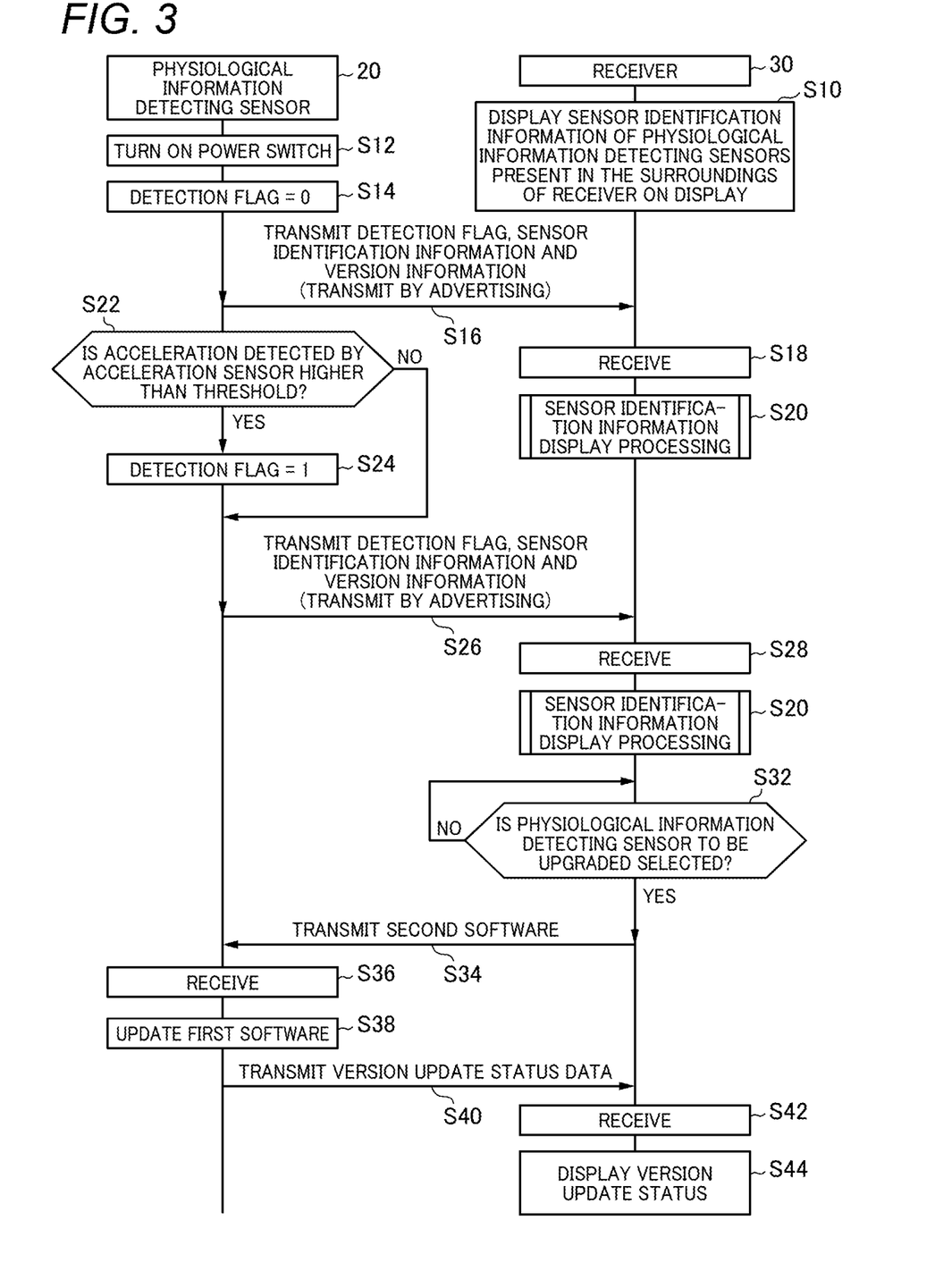
FIG. 3 is a sequence diagram for explaining an operation of the medical telemeter system 10.

Next, an operation example of a medical telemeter system 10 having the aforementioned configuration will be described. FIG. 3 is a sequence diagram for explaining an operation of the medical telemeter system 10.

The following processing of a receiver 30 is carried out mainly by a CPU of the receiver 30 that executes an upgrade application 33a read from a memory 33 into an RAM. In addition, the following processes of physiological information detecting sensors 20 are carried out mainly by CPUs of the physiological information detecting sensors 20 each of which executes first software 23b read from a memory 23 into an RAM.

The receiver 30 receives sensor identification information 23a and version information 23c transmitted by the physiological information detecting sensors 20 present in the surroundings of the receiver 30, and displays the received sensor identification information 23a and the received version information 23c on a display 31 (step S10).

Figure 5A:
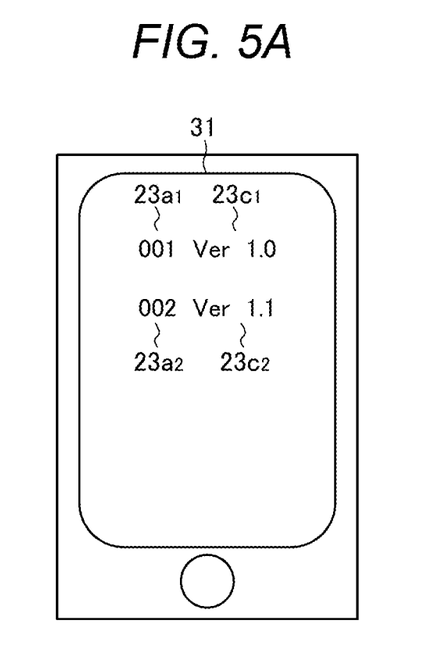
FIGS. 5A to 5C are display examples of a display 31.

When, for example, a wireless communication section 35 receives sensor identification information $23a_1$ and version information $23c_1$ that are transmitted by a physiological information detecting sensor $20_1$ present in the surroundings of the receiver 30, and sensor identification information $23a_2$ and version information $23c_2$ that are transmitted by a physiological information detecting sensor $20_2$ present in the surroundings of the receiver 30, the receiver 30 (display controller 32) displays the received sensor identification information $23a_1$ with the received version information $23c_1$ and the received sensor identification information $23a_2$ with the received version information $23c_2$ in a list form on the display 31, as illustrated in FIG. 5A.

Next, when a power switch (not illustrated) of a physiological information detecting sensor 20 is turned ON (step S12), a CPU of the physiological information detecting sensor 20 sets "0" as information indicating that an acceleration detected by an acceleration sensor 24 is not higher than a threshold, in a detection flag 23d stored in a memory 23 of the physiological information detecting sensor 20 (step S14).

For example, when a power switch (not illustrated) of a physiological information detecting sensor $20_3$ is turned ON, a CPU of the physiological information detecting sensor $20_3$ sets "0" as information indicating that an acceleration detected by an acceleration sensor 24 is not higher than a threshold, in a detection flag 23d stored in a memory 23 of the physiological information detecting sensor $20_3$.

Next, the CPU of the physiological information detecting sensor $20_3$ reads the detection flag 23d, sensor identification information $23a_3$ and version information $23c_3$ from the memory 23 of the physiological information detecting sensor $20_3$, associates the detection flag 23d with the sensor identification information $23a_3$ and the version information $23c_3$, and transmits (by advertising) the detection flag 23d, the sensor identification information $23a_3$ and the version information $23c_3$ to the receiver 30 through a wireless communication section 26 at a predetermined time interval (step S16).

Next, when the wireless communication section 35 receives the detection flag 23$d$, the sensor identification information 23$a_3$ and the version information 23$c_3$ (step S18), the CPU of the receiver 30 executes sensor identification information display processing (step S20).

Figure 4:
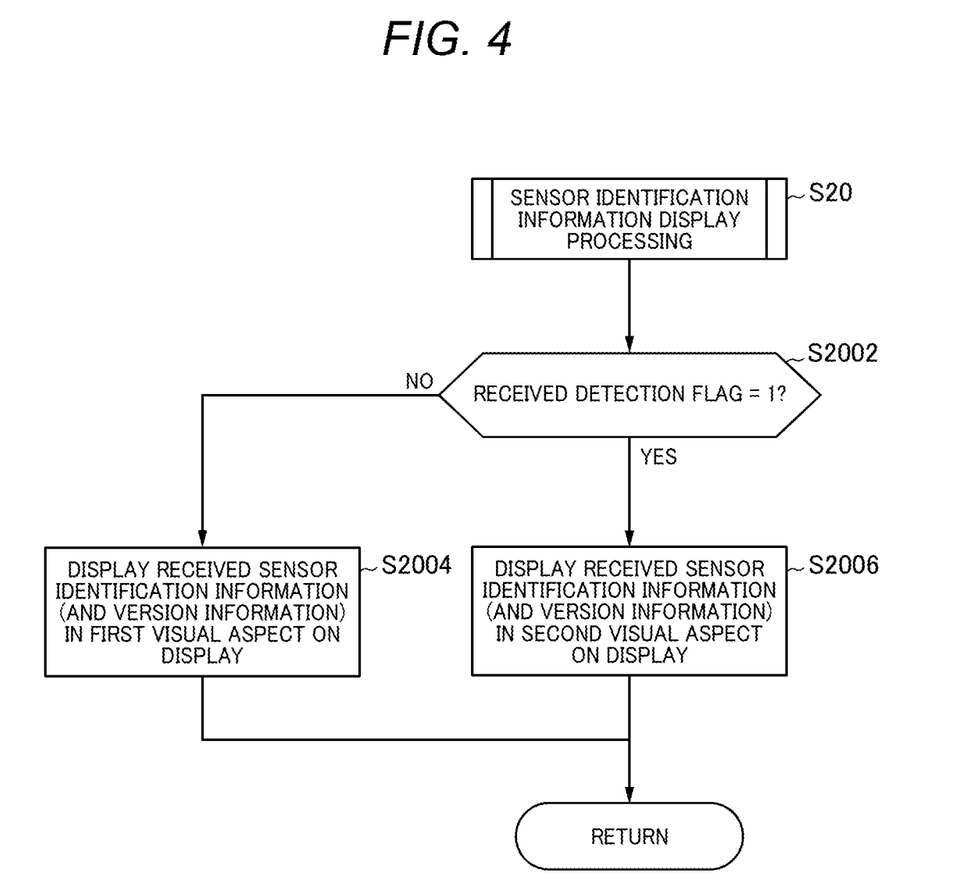
FIG. 4 is a flowchart for explaining sensor identification information display processing.

Next, the sensor identification information display processing will be described. FIG. 4 is a flowchart for explaining the sensor identification information display processing.

Specifically, first, the CPU of the receiver 30 determines whether "1" has been set or not in the detection flag 23$d$ received in the step S18, as illustrated in FIG. 4 (step S2002).

Figure 5B:
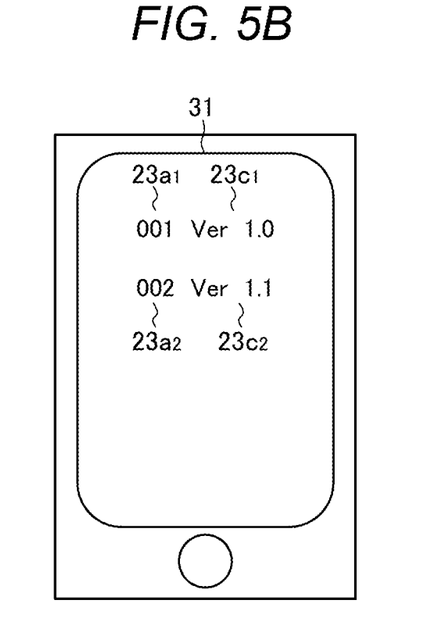

Here, "0" has been set in the detection flag 23$d$ received in the step S18 (the step S2002: No). Accordingly, the receiver 30 (the display controller 32) displays the sensor identification information 23$a_3$ and the version information 23$c_3$ which have been associated with the detection flag 23$d$ received in the step S18, in a first visual aspect on the display 31, as illustrated in FIG. 5B (step S2004).

The first visual aspect is the same visual aspect as that for other sensor identification information 23$a$ and other version information 23$c$ (the sensor identification information 23$a_1$ with the version information 23$c_1$ and the sensor identification information 23$a_2$ with the version information 23$c_2$ here). For example, the first visual aspect is a visual aspect in which the sensor identification information 23$a_3$ and the version information 23$c_3$ are displayed in the same color, the same font and the same size as other sensor identification information 23$a$ and other version information 23$c$ (the sensor identification information 23$a_1$ with the version information 23$c_1$ and the sensor identification information 23$a_2$ with the version information 23$c_2$ here).

As described above, the receiver 30 (the display controller 32) controls the visual aspect of the display 31 in accordance with (setting contents of) the received detection flag 23$d$. Specifically, when (setting contents of) the received detection flag 23$d$ does not indicate that the acceleration is higher than the threshold (i.e. when the detection flag 23$d$=0), the receiver 30 (the display controller 32) controls the visual aspect for the sensor identification information 23$a_3$ and the version information 23$c_3$ to be the first visual aspect.

Next, return to FIG. 3. The CPU (determination section 25$a$) of the physiological information detecting sensor 20 determines whether the acceleration detected by the acceleration sensor 24 is higher than the threshold or not (step S22).

When, for example, an operator shakes the physiological information detecting sensor 20$_3$ so that the acceleration detected by the acceleration sensor 24 is higher than the threshold, the CPU (determination section 25$a$) of the physiological information detecting sensor 20$_3$ determines that the acceleration detected by the acceleration sensor 24 is higher than the threshold (the step S22: Yes). Then, the CPU (the determination section 25$a$) of the physiological information detecting sensor 20$_3$ sets "1" as information indicating that the acceleration detected by the acceleration sensor 24 is higher than the threshold, in the detection flag 23$d$ (step S24).

Next, the CPU of the physiological information detecting sensor 20$_3$ reads the detection flag 23$d$, the sensor identification information 23$a_3$ and the version information 23$c_3$ from the memory 23 of the physiological information detecting sensor 20$_3$, associates the detection flag 23$d$ with the sensor identification information 23$a_3$ and the version information 23$c_3$, and transmits (by advertising) the detection flag 23$d$, the sensor identification information 23$a_3$ and the version information 23$c_3$ to the receiver 30 via the wireless communication section 26 (step S26).

Next, when the wireless communication section 35 receives the detection flag 23$d$, the sensor identification information 23$a_3$ and the version information 23$c_3$ (step S28), the CPU of the receiver 30 executes sensor identification information display processing (step S20).

Specifically, first, the CPU of the receiver 30 determines whether "1" has been set or not in the detection flag 23$d$ received in the step S28, as illustrated in FIG. 4 (step S2002).

Figure 5C:
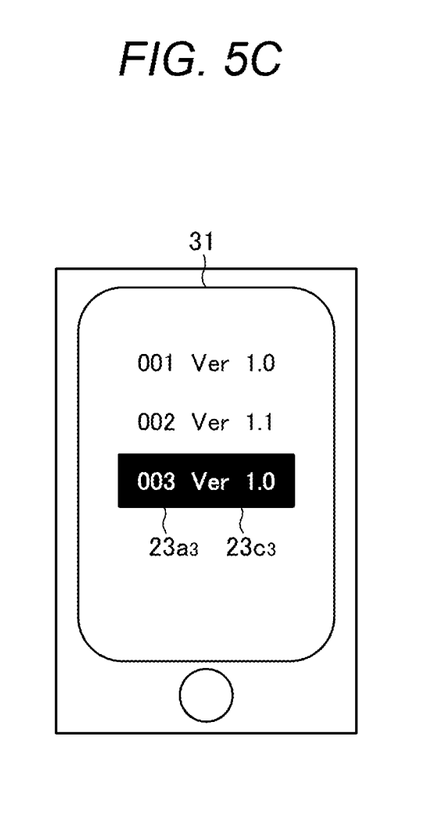

Here, "1" has been set in the detection flag 23$d$ received in the step S28 (the step S2002: Yes). Accordingly, the receiver 30 (the display controller 32) displays the sensor identification information 23$a_3$ and the version information 23$c_3$ which have been associated with the detection flag 23$d$ received in the step S28, in a second visual aspect on the display 31, as illustrated in FIG. 5C (step S2006).

The second visual aspect is a different visual aspect from that for the other sensor identification information 23$a$ and the other version information 23$c$ (the sensor identification information 23$a_1$ with the version information 23$c_1$ and the sensor identification information 23$a_2$ with the version information 23$c_2$ here). For example, the second visual aspect is a visual aspect in which the sensor identification information 23$a_3$ and the version information 23$c_3$ which have been associated with the detection flag 23$d$ received in the step S28 are inversely displayed, as illustrated in FIG. 5C. Thus, the second visual aspect is a visual aspect in which the sensor identification information 23$a_3$ and the version information 23$c_3$ which have been associated with the received detection flag 23$d$ are displayed to be distinguished from the other sensor identification information 23$a$ and the other version information 23$c$ (the sensor identification information 23$a_1$ with the version information 23$c_1$ and the sensor identification information 23$a_2$ with the version information 23$c_2$ here).

Incidentally, the second visual aspect may be a visual aspect in which the sensor identification information 23$a_3$ and the version information 23$c_3$ which have been associated with the detection flag 23$d$ received in the step S28 are displayed in a blinking manner, or a visual aspect in which the sensor identification information 23$a_3$ and the version information 23$c_3$ which have been associated with the detection flag 23$d$ received in the step S28 are displayed in a different color, a different font or a different size from the other sensor identification information 23$a$ and the other version information 23$c$ (the sensor identification information 23$a_1$ with the version information 23$c_1$ and the sensor identification information 23$a_2$ with the version information 23$c_2$ here). In addition, the second visual aspect may be a visual aspect in which the sensor identification information 23$a_3$ and the version information 23$c_3$ which have been associated with the detection flag 23$d$ received in the step S28 are displayed in an enclosed state with a frame, may be a visual aspect in which the sensor identification information 23$a_3$ and the version information 23$c_3$ which have been associated with the detection flag 23$d$ received in the step S28 are displayed in an underlined state, or may be any other visual aspect.

The operator can visually recognize the sensor identification information 23$a_3$ and the version information 23$c_3$ (see FIG. 5C) displayed in the second visual aspect on the display 31. Accordingly, the operator can visually recognize that the physiological information detecting sensor 20$_3$ shaken by the operator is the target to be upgraded. That is, the operator who visually recognizes the sensor identification information $23a_3$ and the version information $23c_3$ (see FIG. 5C) displayed in the second visual aspect on the display 31 can easily specify where the physiological information detecting sensor $20_3$ is present as the target to be upgraded.

As described above, the receiver 30 (the display controller 32) controls the visual aspect of the display 31 in accordance with (the setting contents of) the received detection flag 23d. Specifically, when (the setting contents of) the received detection flag 23d indicates that the acceleration is higher than the threshold (i.e. the detection flag 23d=1), the receiver 30 (the display controller 32) controls the visual aspect for the sensor identification information $23a_3$ and the version information $23c_3$ to be the second visual aspect.

Next, from the sensor identification information displayed on the display 31, the operator selects a physiological information detecting sensor (a sensor identification information) to be upgraded. Specifically, the operator taps the display 31 through a touch panel to select the physiological information detecting sensor (the sensor identification information) to be upgraded. Here, assume that, from the sensor identification information displayed on the display 31, the operator has selected the sensor identification information $23a_3$ displayed inversely as illustrated in FIG. 5C, as the physiological information detecting sensor (the sensor identification information) to be upgraded.

When the sensor identification information $23a_3$ is selected (step S32: Yes), the CPU of the receiver 30 establishes connection with the physiological information detecting sensor $20_3$ having the selected sensor identification information $23a_3$, reads second software 33b from the memory 33, and transmits the read second software 33b to the physiological information detecting sensor $20_3$ having the selected sensor identification information $23a_3$ through the wireless communication section 35 (step S34).

Next, when the wireless communication section 26 receives the second software 33b (step S36), the CPU of the physiological information detecting sensor $20_3$ updates (renews) a version of first software 23b based on the received second software 33b (step S38).

Next, the CPU of the physiological information detecting sensor $20_3$ transmits version update status data indicating a version update status to the receiver 30 through the wireless communication section 26 (step S40).

When the wireless communication section 35 receives the version update status data (step S42), the receiver 30 displays the version update status on the display 31, for example, in the form of a bar graph (step S44).

In the aforementioned manner, the physiological information detecting sensor $20_3$ can be upgraded. Incidentally, the other physiological information detecting sensors $20_1$, $20_2$ . . . and $20_n$ can be also upgraded in a similar manner or the same manner.

According to the embodiment as described above, it is possible to provide the medical telemeter system 10 in which, when a physiological information detecting sensor 20 that is not provided with a display such as an LED is intended to be upgraded by wireless communication, the physiological information detecting sensor 20 can be visually recognized as the target to be upgraded.

This is achieved by the display controller 32 that controls the visual aspect of the display 31 (e.g. for the sensor identification information) in accordance with (the setting contents of) the received detection flag 23d.

Specifically, when (the setting contents of) the received detection flag 23d indicates that the acceleration is not higher than the threshold (i.e. when the detection flag 23d=0), the display controller 32 controls the visual aspect for the sensor identification information $23a_3$ and the version information $23c_3$ to be the first visual aspect. On the other hand, when (the setting contents of) the received detection flag 23d indicates that the acceleration is higher than the threshold (i.e. when the detection flag 23d=1), the display controller 32 controls the visual aspect for the sensor identification information $23a_3$ and the version information $23c_3$ to be the second visual aspect.

Next, a modification will be described.

An example in which a physiological information detecting sensor detecting an ECG (electrocardiogram) is used as each physiological information detecting sensor 20 has been described in the aforementioned embodiment. However, the present embodiment is not limited thereto. For example, other physiological information detecting sensors such as a physiological information detecting sensor detecting NIBP (None-Invasive Blood Pressure), a physiological information detecting sensor detecting body temperature (TEMP), and a physiological information detecting sensor detecting SpO2 (percutaneous arterial oxygen saturation) may be used as the physiological information detecting sensor 20.

In addition, an example in which a communication module (e.g. a BLE (Bluetooth Low Energy) module) conformable to BLE technology is used as each of the wireless communication sections 26 and 35 has been described in the aforementioned embodiment. However, the present embodiment is not limited thereto. For example, a communication module (e.g. a wireless LAN module) conformable to wireless LAN technology may be used as the wireless communication section 26, 35.

In addition, an example in which the CPU of the receiver 30 transmits the second software 33b read from the memory 33 to the physiological information detecting sensor $20_3$ (the step S24) has been described in the aforementioned embodiment. However, the present embodiment is not limited thereto. For example, the CPU of the receiver 30 may be designed to gain access to an external server, acquire the second software 33b from the external server, and transmit the acquired second software 33b to the physiological information detecting sensor $20_3$.

In addition, an example in which after the physiological information detecting sensor $20_3$ transmits the detection flag 23d, the sensor identification information $23a_3$, and the version information $23c_3$, and the wireless communication section 35 receives the detection flag 23d, the sensor identification information $23a_3$ and the version information $23c_3$, the receiver 30 displays the received sensor identification information $23a_3$ and the received version information $23c_3$ on the display 31 has been described in the aforementioned embodiment. However, the present embodiment is not limited thereto.

For example, the version information $23c_3$ may be omitted. That is, after the physiological information detecting sensor $20_3$ transmits the detection flag 23d and the sensor identification information $23a_3$, and the wireless communication section 35 receives the detection flag 23d and the sensor identification information $23a_3$, the receiver 30 may display the received sensor identification information $23a_3$ on the display 31.

In addition, an example in which the physiological information detecting sensor 20 determines whether the acceleration detected by the acceleration sensor 24 is higher than the threshold or not has been described in the aforementioned embodiment. However, the present embodiment is not limited thereto. For example, the receiver 30 may alternatively determines whether the acceleration detected by the acceleration sensor 24 is higher than the threshold or not.

Figure 6:
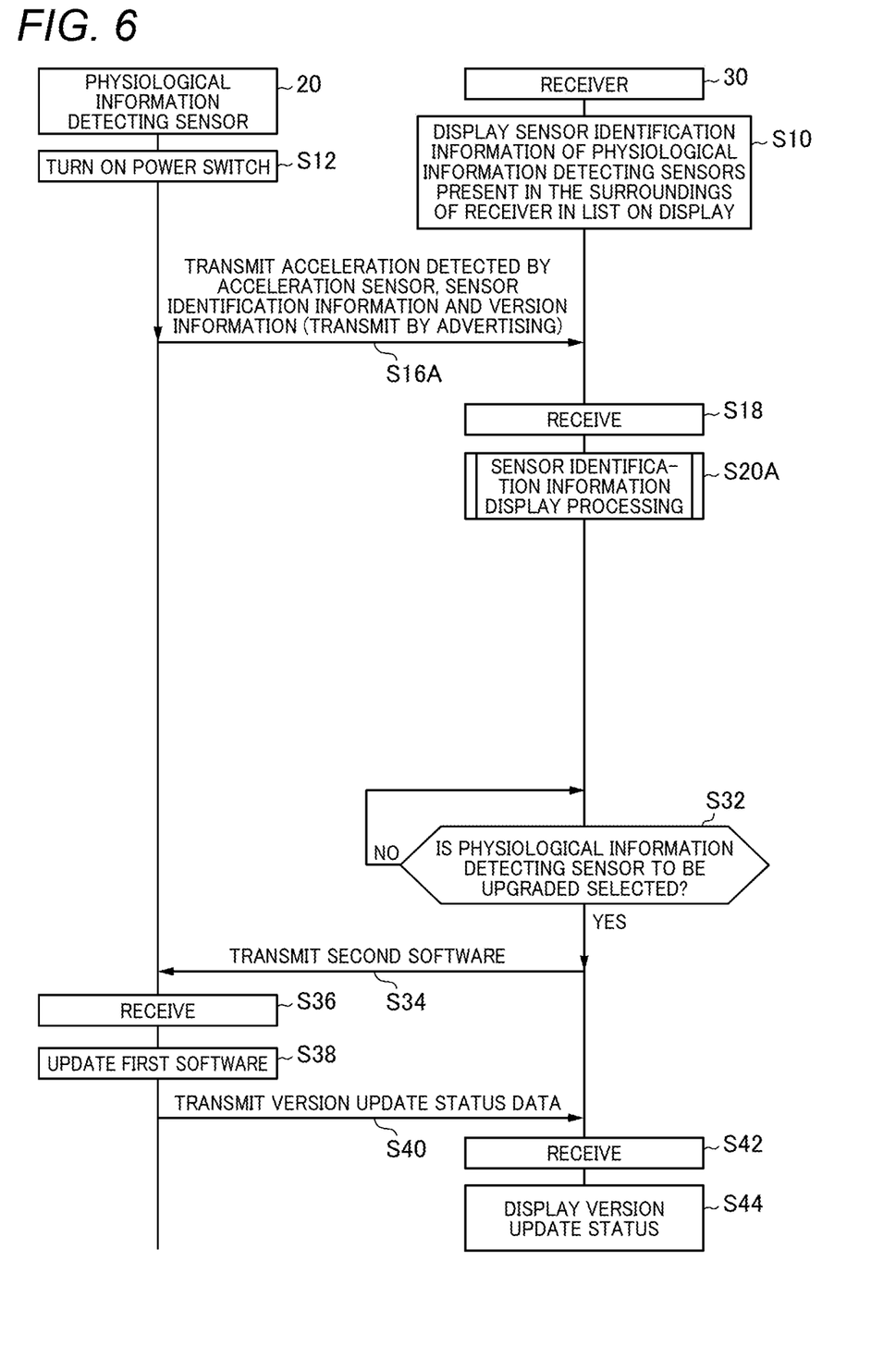
FIG. 6 is a sequence diagram for explaining an operation (modification) of the medical telemeter system 10.

An example in which whether the acceleration detected by the acceleration sensor 24 is higher than the threshold or not is determined by the receiver 30 will be described below as an operation (modification) of the medical telemeter system 10. FIG. 6 is a sequence diagram for explaining the operation (modification) of the medical telemeter system 10. FIG. 6 is equivalent to a sequence diagram in which the steps S14 and S22 to S28 in the flowchart illustrated in FIG. 3 have been deleted, the step S16 of "transmitting (transmitting by advertising) the detection flag, the sensor identification information and the version information" has been replaced by a step S16A of "transmitting (transmitting by advertising) the acceleration detected by the acceleration sensor, the sensor identification information and the version information", and the step S20 has been replaced by a step S20A. Except the aforementioned points, FIG. 6 is similar to or the same as the flowchart illustrated in FIG. 3.

As illustrated in FIG. 6, the receiver 30 receives sensor identification information 23a and version information 23c transmitted from physiological information detecting sensors 20 present in the surroundings of the receiver 30, and displays the received sensor identification information 23a and the received version information 23c on the display 31 (step S10).

When, for example, the wireless communication section 35 receives a sensor identification information $23a_1$ and a version information $23c_1$ that are transmitted by a physiological information detecting sensor $20_1$ present in the surroundings of the receiver 30, and a sensor identification information $23a_2$ and a version information $23c_2$ that are transmitted by a physiological information detecting sensor $20_2$ present in the surroundings of the receiver 30, the receiver 30 (the display controller 32) displays the received sensor identification information $23a_1$ with the received version information $23c_1$ and the received sensor identification information $23a_2$ with the received version information $23c_2$ in a list form on the display 31, as illustrated in FIG. 5A.

Next, when a power switch (not illustrated) of a physiological information detecting sensor $20_3$ is turned ON (step S12), a CPU of the physiological information detecting sensor $20_3$ reads a sensor identification information $23a_3$ and a version information $23c_3$ from a memory 23 of the physiological information detecting sensor $20_3$, associates an acceleration detected by an acceleration sensor 24 with the read sensor identification information $23a_3$ and the read version information $23c_3$, and transmits (by advertising) the acceleration, the sensor identification information $23a_3$ and the version information $23c_3$ to the receiver 30 through a wireless communication section 26 at a predetermined time interval (step S16A).

Next, when the wireless communication section 35 receives the acceleration detected by the acceleration sensor 24, the sensor identification information $23a_3$ and the version information $23c_3$ (step S18), the CPU of the receiver 30 executes sensor identification information display processing (step S20A).

Figure 7:
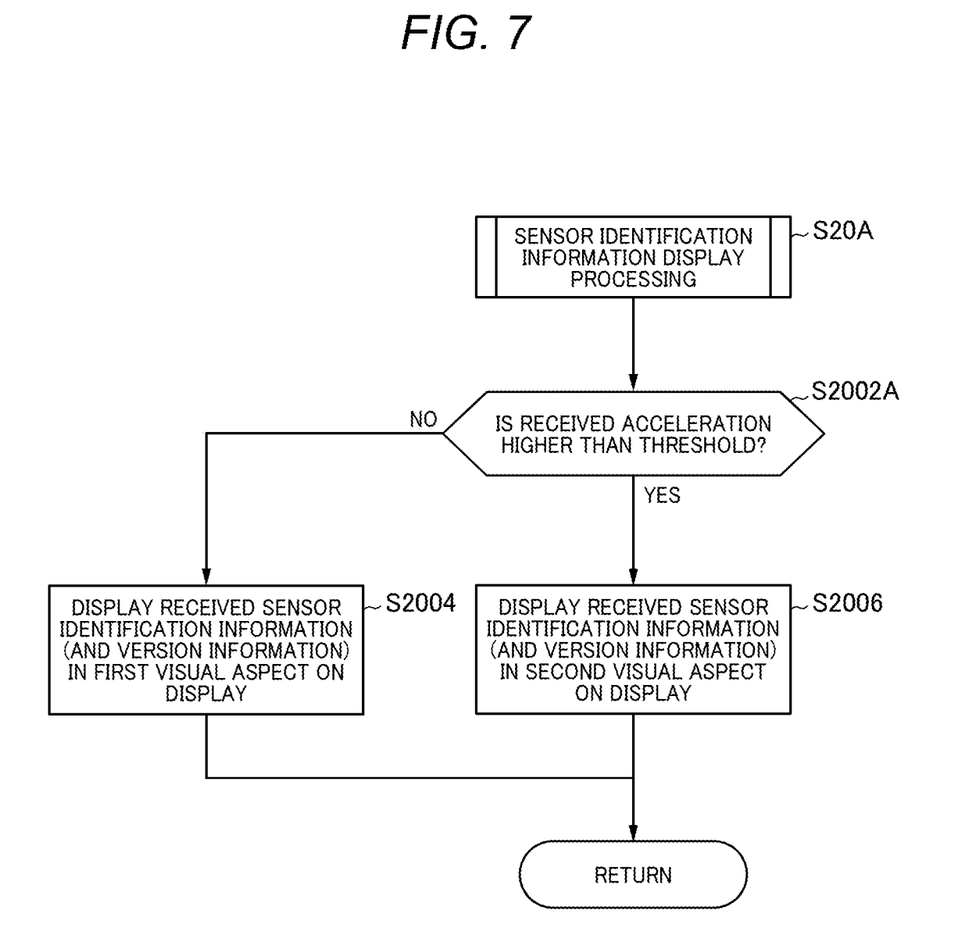
FIG. 7 is a flowchart for explaining sensor identification information display processing (modification).

Next, the sensor identification information display processing (modification) will be described. FIG. 7 is a flowchart for explaining the sensor identification information display processing (modification). FIG. 7 corresponds to a flowchart in which the step S2002 "received detection flag=1?" in the flowchart illustrated in FIG. 4 is replaced by a step S2002A "Is received acceleration higher than threshold?". Except the aforementioned point, FIG. 7 is similar to or the same as the flowchart illustrated in FIG. 4.

Specifically, first, the CPU of the receiver 30 determines whether the acceleration received in the step S18 is higher than the threshold or not, as illustrated in FIG. 7 (step S2002A).

When the acceleration received in the step S18 is not higher than the threshold (the step S2002A: No), the display controller 32 of the receiver 30 displays the sensor identification information $23a_3$ and the version information $23c_3$ which have been associated with the acceleration received in the step S18, in a first visual aspect on the display 31, as illustrated in FIG. 5B (step S2004).

On the other hand, when the acceleration received in the step S18 is higher than the threshold (the step S2002A: Yes), the display controller 32 of the receiver 30 displays the sensor identification information $23a_3$ and the version information $23c_3$ which have been associated with the acceleration received in the step S18, in a second visual aspect on the display 31, as illustrated in FIG. 5C (step S2006).

As described above, the receiver 30 (the display controller 32) controls the visual aspect of the display 31 in accordance with whether the received acceleration is higher than the threshold or not. Specifically, when the received acceleration is not higher than the threshold, the receiver 30 (the display controller 32) controls the visual aspect for the sensor identification information $23a_3$ and the version information $23c_3$ to be the first visual aspect. On the other hand, when the received acceleration is higher than the threshold, the receiver 30 (the display controller 32) controls the visual aspect for the sensor identification information $23a_3$ and the version information $23c_3$ to be the second visual aspect.

The operator can visually recognize the sensor identification information $23a_3$ and the version information $23c_3$ (see FIG. 5C) displayed in the second visual aspect on the display 31. Accordingly, the operator can visually recognize that the physiological information detecting sensor $20_3$ shaken by the operator is the target to be upgraded. That is, the operator can visually recognize the sensor identification information $23a_3$ and the version information $23c_3$ (see FIG. 5C) displayed in the second visual aspect on the display 31. Accordingly, the operator can easily specify where the physiological information detecting sensor $20_3$ is present as the target to be upgraded.

Refer to FIG. 6. Processes illustrated in the step S32 to S44 are executed below in a similar manner to or the same manner as those in FIG. 3.

In the aforementioned manner, the physiological information detecting sensor $20_3$ can be upgraded. Incidentally, the other physiological information detecting sensors $20_1$, $20_2$ ... and $20_n$ can be also upgraded in a similar manner or the same manner.

Similar effects to or the same effects as those in the aforementioned embodiment can be also obtained by the modification.

All of the numerical values illustrated in the aforementioned embodiment are simply exemplified. It is a matter of course that other suitable numerical values than the aforementioned numerical values can be used.

The present disclosure is not limited to the aforementioned embodiment or modification. However, modification, improvement, etc. can be made on the present disclosure suitably and desirably. In addition, the materials, shapes, forms, numbers, arrangement places, etc. of the respective constituent elements in the aforementioned embodiment are not limited but may be set desirably as long as the present disclosure can be achieved.

What is claimed is:

1. A system comprising at least one physiological information detecting sensor and an information processing apparatus wirelessly connected to the physiological information detecting sensor,
wherein the physiological information detecting sensor comprises:
an acceleration sensor that detects an acceleration of the physiological information detecting sensor;
a memory that stores first software, flag information indicating whether the acceleration is higher than a threshold or not, and sensor identification information of the physiological information detecting sensor, wherein the flag information and the sensor identification information are associated with each other;
a first transmitter that transmits, to the information processing apparatus, the flag information and the sensor identification information;
a first receiver that receives second software for updating a version of the first software; and
an updating section that updates the version of the first software based on the second software,
wherein the information processing apparatus comprises:
a second receiver that receives the flag information and the sensor identification information from the physiological information detecting sensor;
a display;
a display controller that displays the sensor identification information on the display; and
a second transmitter that transmits the second software to the physiological information detecting sensor indicated by the sensor identification information selected through a user input operation, and
wherein the display controller is configured to change a visual aspect of the sensor identification information displayed on the display in accordance with the flag information.

2. The system according to claim 1, wherein the display controller is configured to change the visual aspect of the sensor identification information associated with flag information indicating that the acceleration is higher than the threshold.

3. The system according to claim 2, wherein the visual aspect of the sensor identification information associated with the flag information indicating that the acceleration is higher than the threshold is different from a visual aspect of another sensor identification information associated with flag information indicating that the acceleration is equal to or lower than the threshold.

4. The system according to claim 1, wherein:
the first transmitter further transmits, to the information processing apparatus, version information of the first software, wherein the version information is associated with the flag information and the sensor identification information;
the second receiver further receives the version information; and
the display controller further displays the version information on the display.

5. A system comprising at least one physiological information detecting sensor and an information processing apparatus wirelessly connected to the physiological information detecting sensor,
wherein the physiological information detecting sensor comprises:
an acceleration sensor that detects an acceleration of the physiological information detecting sensor;
a memory that stores first software, acceleration information indicating the acceleration, and sensor identification information of the physiological information detecting sensor, wherein the acceleration information and the sensor identification information are associated with each other;
a first transmitter that transmits, to the information processing apparatus, the acceleration information and the sensor identification information;
a first receiver that receives second software for updating a version of the first software; and
an updating section that updates the version of the first software based on the second software,
wherein the information processing apparatus comprises:
a second receiver that receives the acceleration information and the sensor identification information from the physiological information detecting sensor;
a display;
a display controller that displays the sensor identification information on the display; and
a second transmitter that transmits the second software to the physiological information detecting sensor indicated by the sensor identification information selected through a user input operation, and
wherein the display controller is configured to change a visual aspect of the sensor identification information displayed on the display in accordance with whether the acceleration is higher than a threshold.

* * * * *